US012677160B2

(12) United States Patent
Cariou

(10) Patent No.: US 12,677,160 B2
(45) Date of Patent: Jul. 7, 2026

(54) APPARATUS, SYSTEM, AND METHOD OF COMMUNICATING A BEAMFORMED TRANSMISSION

(71) Applicant: Intel Corporation, Santa Clara, CA (US)

(72) Inventor: Laurent Cariou, Milizac (FR)

(73) Assignee: INTEL CORPORATION, Santa Clara, CA (US)

( * ) Notice: Subject to any disclaimer, the term of this patent is extended or adjusted under 35 U.S.C. 154(b) by 9 days.

(21) Appl. No.: 17/854,215

(22) Filed: Jun. 30, 2022

(65) Prior Publication Data

US 2022/0338026 A1 Oct. 20, 2022

(51) Int. Cl.
| | |
|---|---|
| *H04W 16/28* | (2009.01) |
| *H04B 7/06* | (2006.01) |
| *H04W 74/08* | (2009.01) |

(52) U.S. Cl.
CPC .......... *H04W 16/28* (2013.01); *H04B 7/0617* (2013.01); *H04W 74/08* (2013.01)

(58) Field of Classification Search
CPC . H04W 16/28; H04W 74/08; H04W 74/0808; H04B 7/0617; H04B 7/063; H04B 7/0639; H04B 7/088
See application file for complete search history.

(56) References Cited

U.S. PATENT DOCUMENTS

| | | | | |
|---|---|---|---|---|
| 2016/0165630 | A1* | 6/2016 | Oteri | H04W 74/04 |
| | | | | 370/336 |
| 2016/0191132 | A1* | 6/2016 | Rajagopal | H04B 7/0695 |
| | | | | 370/329 |
| 2018/0145732 | A1* | 5/2018 | Shen | H04B 7/088 |
| 2020/0044337 | A1* | 2/2020 | Abdallah | H04B 7/0695 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Dady Chery
(74) *Attorney, Agent, or Firm* — Shichrur & Co.

(57) ABSTRACT

For example, an Access Point (AP) may be configured to determine a plurality of beamformed sectors for communication with a plurality of wireless communication stations (STAs), wherein a beamformed sector for communication with a STA is based on a beamforming training between the AP and the STA; to determine a grouping sector for communication between the AP and a group of STAs including two or more grouped STAs of the plurality of STAs, wherein the grouping sector covers two or more beamformed sectors corresponding to the two or more grouped STAs; to listen over the grouping sector for a transmission from a grouped STA of the group of STAs; and, based on the transmission from the grouped STA, to communicate a beamformed transmission with the grouped STA via a beamformed sector corresponding to the grouped STA.

24 Claims, 9 Drawing Sheets

(56) References Cited

OTHER PUBLICATIONS

IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 2: Enhanced Throughput for Operations in License-exempt Bands above 45 GHz, IEEE Computer Society, IEEE Std 802.11ay™-2021 (Amendment to IEEE Std 802.11™-2020 as amended by IEEE Std 802.11ax™-2021), 768 pages.

* cited by examiner

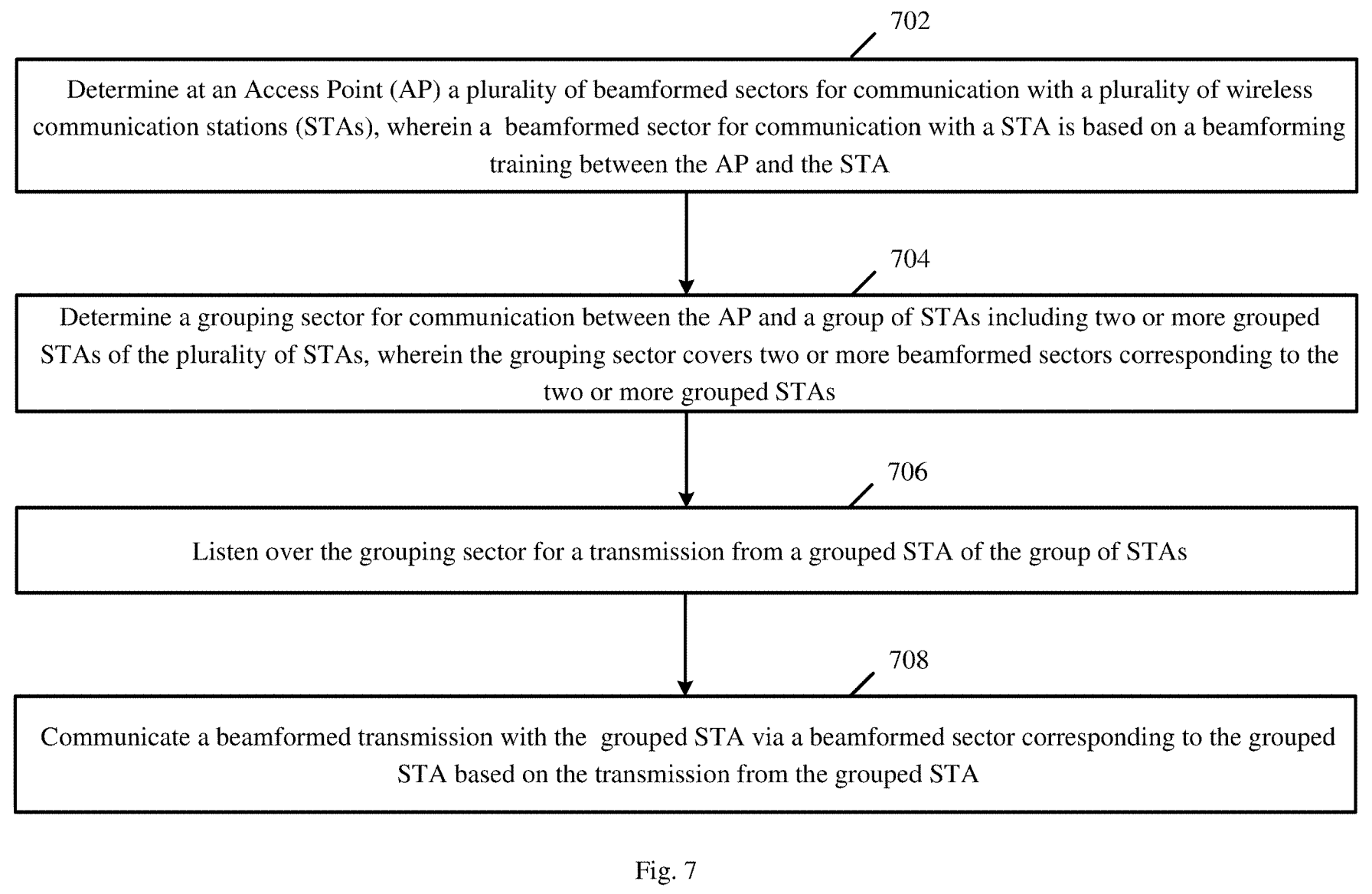

702

Determine at an Access Point (AP) a plurality of beamformed sectors for communication with a plurality of wireless communication stations (STAs), wherein a beamformed sector for communication with a STA is based on a beamforming training between the AP and the STA

704

Determine a grouping sector for communication between the AP and a group of STAs including two or more grouped STAs of the plurality of STAs, wherein the grouping sector covers two or more beamformed sectors corresponding to the two or more grouped STAs

706

Listen over the grouping sector for a transmission from a grouped STA of the group of STAs

708

Communicate a beamformed transmission with the grouped STA via a beamformed sector corresponding to the grouped STA based on the transmission from the grouped STA

Fig. 7

APPARATUS, SYSTEM, AND METHOD OF COMMUNICATING A BEAMFORMED TRANSMISSION

TECHNICAL FIELD

Aspects described herein generally relate to communicating a beamformed transmission.

BACKGROUND

Devices in a wireless communication system may be configured to communicate over a millimeterWave (mmWave) wireless communication channel. There is a need to provide a technical solution to support beamforming communications over the mmWave wireless communication channel.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic flow-chart illustration of a method of communicating a beamformed transmission, in accordance with some demonstrative aspects.

DETAILED DESCRIPTION

Figure 1:
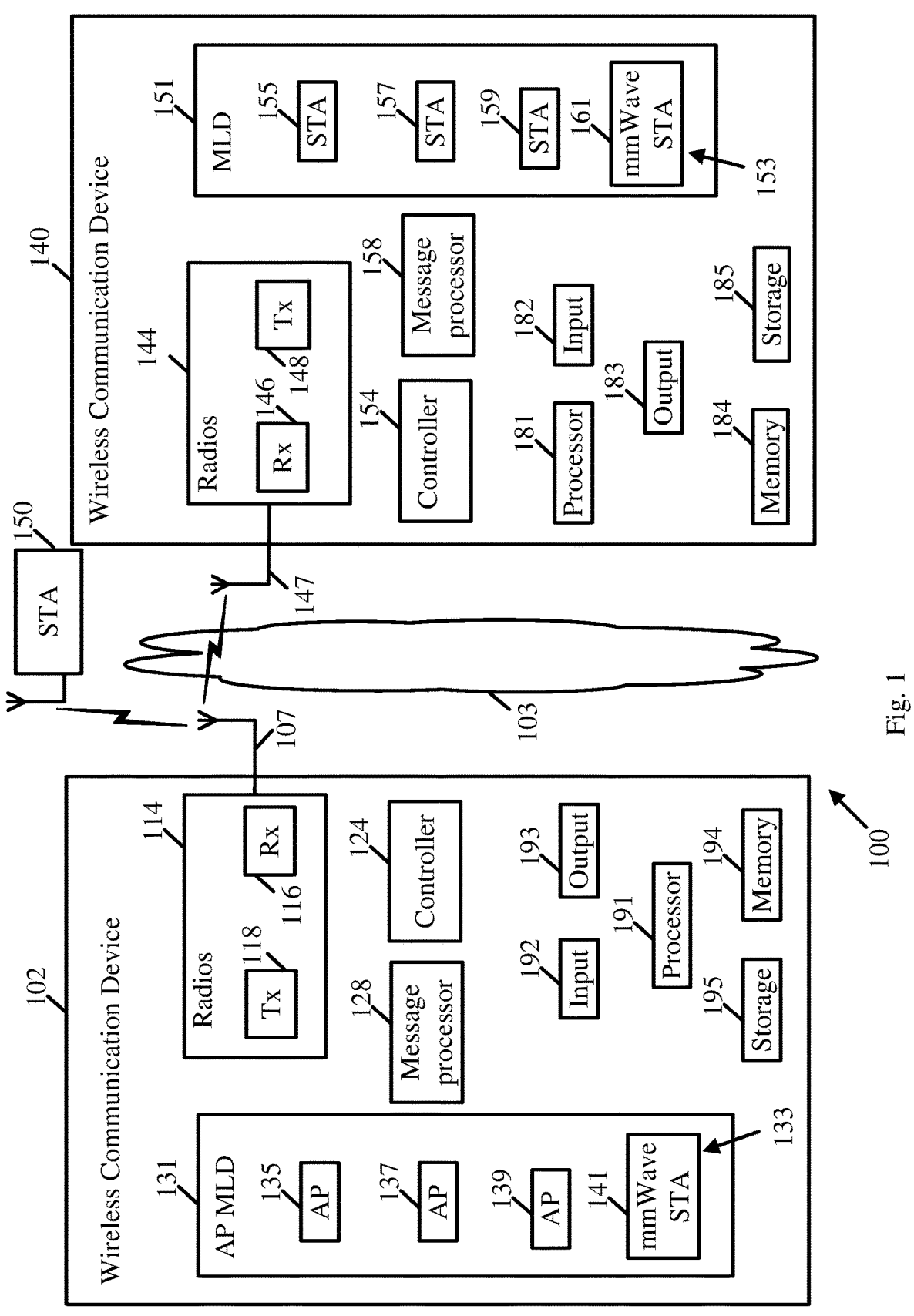
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December,* 2020); and/or IEEE 802.11be (IEEE *P802.11be/ D1.5 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT),* March 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 150, and/or one or more other devices.

In some demonstrative aspects, devices 102, 140, and/or 150 may include a mobile device or a non-mobile, e.g., a static, device.

For example, devices 102, 140, and/or 150 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 150 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band.

In other aspects, WM 103 may include any other type of channel over any other frequency band.

In some demonstrative aspects, device 102, device 140, and/or device 150 may include one or more radios including circuitry and/or logic to perform wireless communication between devices 102, 140, 150 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) includ-ing circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a sub-10 Ghz band, for example, 2.4 GHz band, a 5 GHz band, a 6 GHz band, and/or any other sub-10 GHz band; and/or an mmWave band, e.g., a 45 Ghz band, a 60 Ghz band, and/or any other mmWave band; and/or any other band, e.g., a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include one or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 150 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 150 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102, device 140, and/or device 150 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In some demonstrative aspects, device 102, device 140, and/or device 150 may include, operate as, perform the role of, and/or perform one or more functionalities of, one or more mmWave STAs, e.g., DMG STAs, EDMG STAs, and/or any other mmWave STA. For example, device 102 may include, operate as, perform the role of, and/or perform one or more functionalities of, one or more mmWave STAs, and/or device 140 may include, operate as, perform the role of, and/or perform one or more functionalities of, one or more mmWave STAs.

In other aspects, devices 102, 140, and/or 150 may include, operate as, perform the role of, and/or perform one or more functionalities of, any other wireless device and/or station, e.g., a WLAN STA, a WiFi STA, and the like.

In some demonstrative aspects, device 102, device 140, and/or device 150 may be configured to operate as, perform the role of, and/or perform one or more functionalities of, an access point (AP), e.g., an EHT AP STA.

In some demonstrative aspects, device 102, device 140, and/or device 150 may be configured to operate as, perform the role of, and/or perform one or more functionalities of, a non-AP STA, e.g., an EHT non-AP STA.

In other aspects, device 102, device 140, and/or device 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102, 140, and/or 150 may be configured to communicate in an EHT network, and/or any other network.

In some demonstrative aspects, devices 102, 140, and/or 150 may be configured to operate in accordance with one or more Specifications, for example, including one or more IEEE 802.11 Specifications, e.g., an IEEE 802.11-2020 Specification, an IEEE 802.11be Specification, an IEEE 802.11 ay Specification and/or any other specification and/or protocol.

In some demonstrative aspects, device 102, device 140, and/or device 150 may include, operate as, perform a role of, and/or perform the functionality of, one or more multi-link logical entities, e.g., as described below.

In other aspect, device 102, device 140, and/or device 150 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102, device 140, and/or device 150 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102, device 140, and/or device 150 may be configured to operate as, perform the role of, and/or perform one or more functionalities of, an AP MLD.

In some demonstrative aspects, device 102, device 140, and/or device 150 may be configured to operate as, perform the role of, and/or perform one or more functionalities of, a non-AP MLD.

In other aspects, device 102, device 140, and/or device 150 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of STAs 133, e.g., including an AP STA 135, an AP STA 137, an AP STA 139, and/or an mmWave STA 141. In some aspects, as shown in FIG. 1, AP MLD 131 may include four STAs. In other aspects, AP MLD 131 may include any other number of STAs.

In one example, AP STA 135, AP STA 137, AP STA 139, and/or mmWave STA 141 may operate as, perform a role of, and/or perform one or more operations and/or functionalities of, an EHT AP STA. In other aspects, AP STA 135, AP STA 137, AP STA 139, and/or mmWave STA 141 may perform any other additional or alternative functionality.

In some demonstrative aspects, mmWave STA 141 may operate as, perform a role of, and/or perform one or more operations and/or functionalities of, a mmWave AP STA. In other aspects, mmWave STA 141 may operate as, perform a role of, and/or perform one or more operations and/or functionalities of an mmWave network controller to control communication over an mmWave wireless communication network.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, for example, the one or more radios 114 may include, for example, a radio for communication by mmWave STA 141 over a fourth wireless communication frequency channel and/or frequency band, e.g., an mmWave band, for example, a wireless communication band above 45 Ghz, for example, a 60 GHz band or any other mmWave band, e.g., as described below.

In some demonstrative aspects, the radios 114 utilized by STAs 133 may be implemented as separate radios. In other aspects, the radios 114 utilized by STAs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157, a STA 159, and/or a STA 161. In some aspects, as shown in FIG. 1, MLD 151 may include four STAs. In other aspects, MLD 151 may include any other number of STAs.

In one example, STA 155, STA 157, STA 159, and/or STA 161 may operate as, perform a role of, and/or perform one or more operations and/or functionalities of, an EHT STA. In other aspects, STA 155, STA 157, STA 159, and/or STA 161 may perform any other additional or alternative functionality.

In some demonstrative aspects, STA 161 may be configured to operate as, perform a role of, and/or perform one or more operations and/or functionalities of, an mmWave STA, e.g., as described below. For example, the mmWave STA 161 may be configured to operate as, perform a role of, and/or perform one or more operations and/or functionalities of, a non-AP mmWave STA, e.g., as described below.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, for example, the one or more radios 144 may include, for example, a radio for communication by mmWave STA 161 over a fourth wireless communication frequency channel and/or frequency band, e.g., a mmWave band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157, STA 159, and/or mmWave STA 161 may operate as, perform a role of, and/or perform one or more operations and/or functionalities of, a non-AP STA, e.g., a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157, STA 159, and/or mmWave STA 161 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
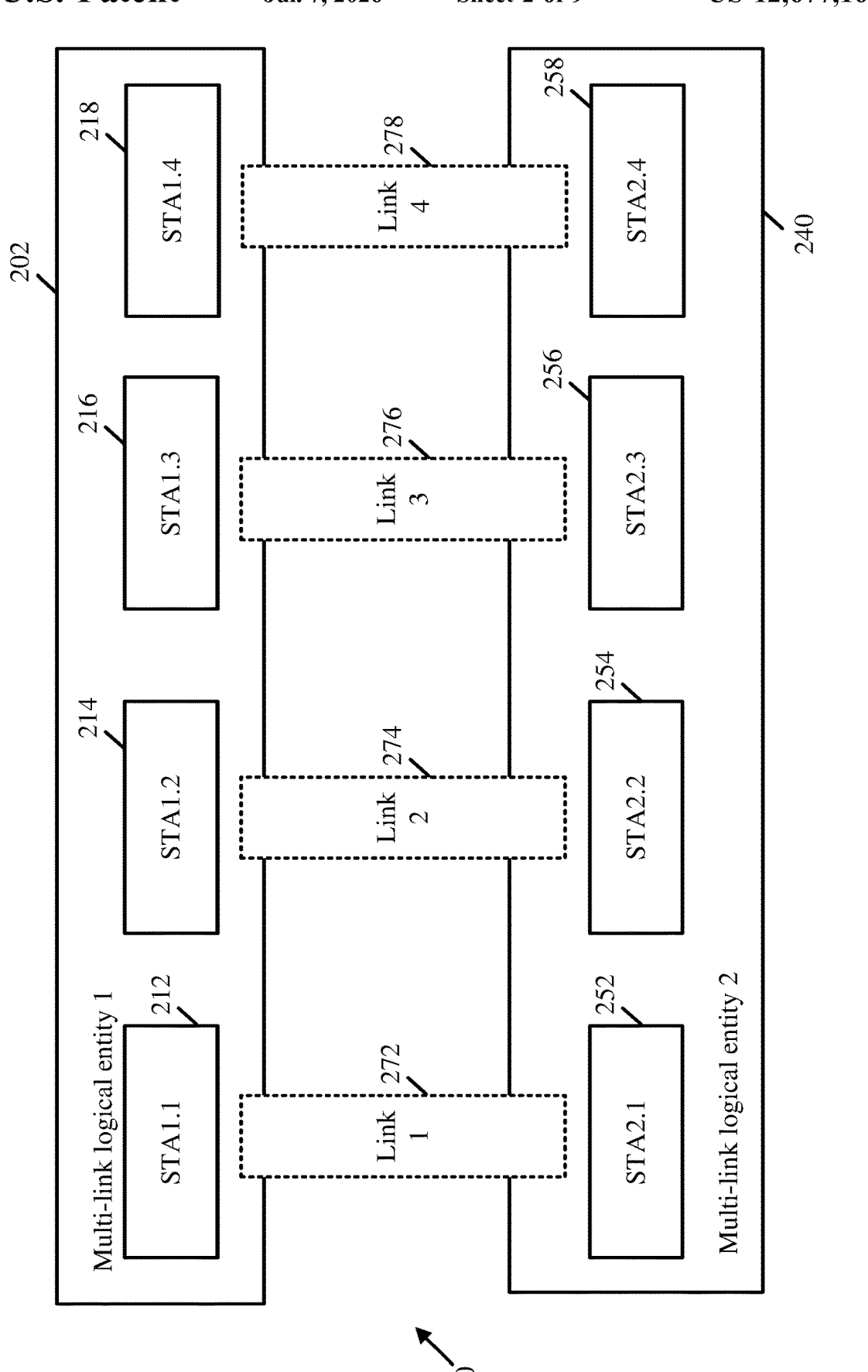
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, a STA 216, and a STA 218. In one example, AP MLD 131 (FIG. 1) may perform one or more operations of, one or more functionalities of, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, a STA 256, and a STA 258. In one example, MLD 151 (FIG. 1) may perform one or more operations of, one or more functionalities of, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, a link 276 between STA 216 and STA 256, and/or a link 278 between STA 218 and STA 258.

Figure 3:
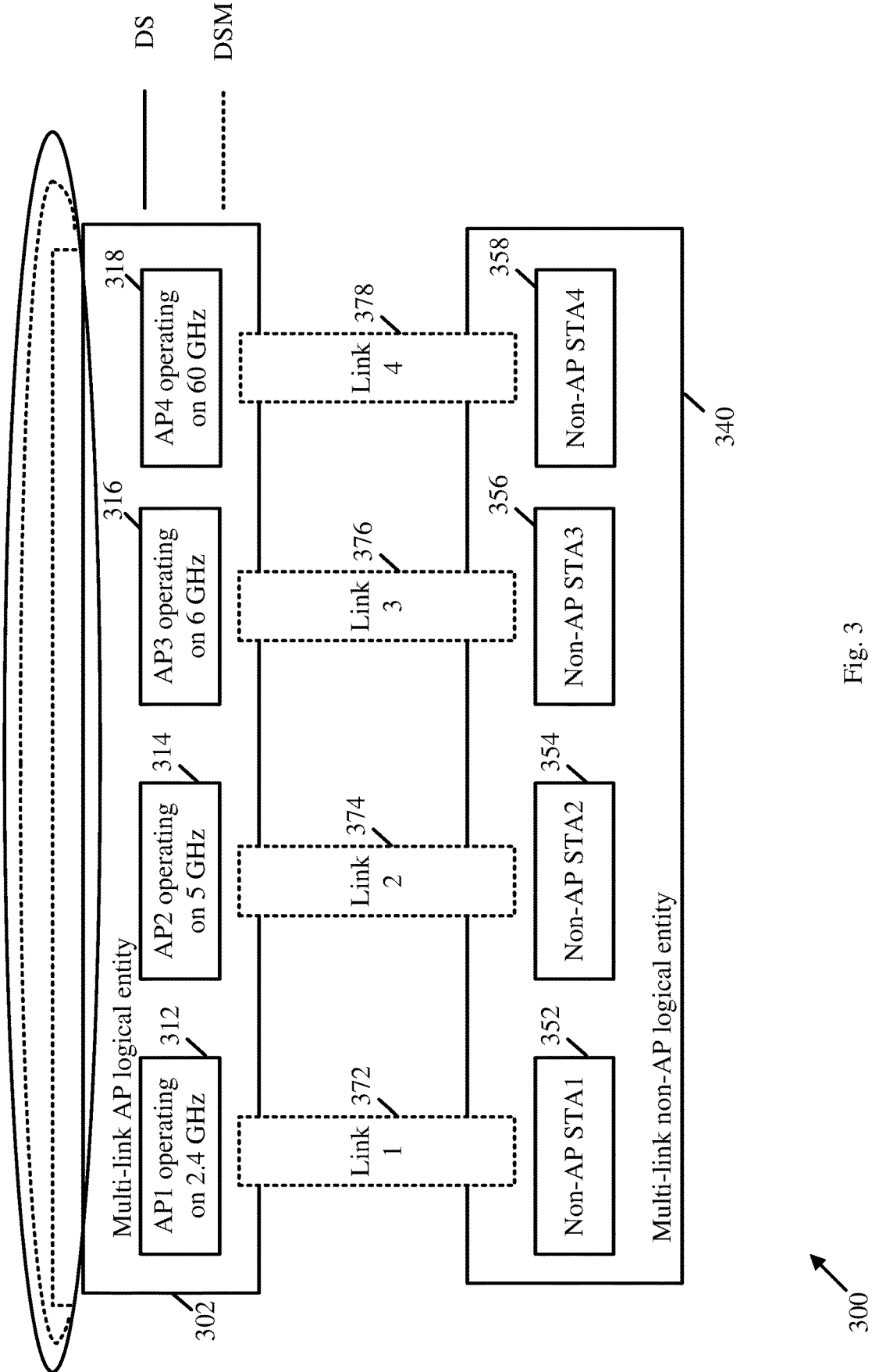
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, an AP STA 316, and an mmWave STA 318. In one example, AP MLD 131 (FIG. 1) may perform one or more operations of, one or more functionalities of, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, a non-AP STA 356, and an mmWave STA 358. In one example, MLD 151 (FIG. 1) may perform one or more operations of, one or more functionalities of, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, a link 376 between AP STA 316 and non-AP STA 356, and/or a link 378 between mmWave STA 318 and mmWave STA 358.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, AP STA 316 may be configured to communicate over a 6 Ghz frequency band, and/or mmWave STA 318 may be configured to communicate over a mmWave frequency band. In other aspects, AP STA 312, AP STA 314, AP STA 316, and/or mmWave STA 318 may be configured to communicate over any other additional or alternative wireless communication frequency bands.

Referring back to FIG. 1, in some demonstrative aspects, device 102, device 140, and/or device 150 may be configured to support a technical solution for communication between mmWave STAs, e.g., mmWave STA 141 and mmWave STA 161 and/or an mmWave STA implemented by device 150, over the mmWave frequency band, e.g., as described below.

In some demonstrative aspects, device 102, device 140, and/or device 150 may be configured to support a technical solution to utilize communications over the sub-10 GHz frequency band, for example, to assist one or more operations to be performed by the mmWave STAs, e.g., mmWave STA 141, mmWave STA 161 and/or the mmWave STA implemented by device 150, over the mmWave frequency band, e.g., as described below.

In some demonstrative aspects, device 102, device 140, and/or device 150 may be configured to support a technical solution to utilize communications over the sub-10 GHz frequency band, for example, to assist a beamforming training procedure to be performed by the mmWave STAs, e.g., mmWave STA 141, mmWave STA 161 and/or the mmWave STA implemented by device 150, over the mmWave frequency band, e.g., as described below.

In some demonstrative aspects, device 102, device 140, and/or device 150 may be configured to provide a technical solution to support mmWave operation, e.g., operation at the 60 GHz band, together with, and/or as part of, a sub-10 Ghz functionality, for example, of a mainstream Wi-Fi protocol, e.g., as described below.

In some demonstrative aspects, device 102, device 140, and/or device 150 may be configured to support a technical solution, which may be based on and/or may utilize cost reduction of a wireless communication architecture, which may allow to reuse at least some components of, e.g., as much as possible of, the same baseband, for communications by both a sub-10 GHz radio, e.g., a regular Wi-Fi radio, and a mmWave radio, e.g., a 60 GHz radio.

In some demonstrative aspects, device 102, device 140, and/or device 150 may be configured to support a technical solution, which may be based on and/or may utilize an enhanced throughput supported by mmWave techniques, e.g., compared to a sub-10 GHz band (lower band), which may have less potential for throughput enhancement.

In some demonstrative aspects, device 102, device 140, and/or device 150 may be configured to support a technical solution, which may be based on, and/or may utilize, a multi-link framework, for example, according to an MLD architecture, e.g., as described above.

In some demonstrative aspects, device 102, device 140, and/or device 150 may be configured to utilize the multi-link framework, for example, to improve operation on multiple links. In one example, the multi-link framework may be utilized to allow compensating for a fragility of an mmWave link, e.g., a 60 GHz link, for example, through a fallback to the sub-10 GHz band (lower band) operation.

In some demonstrative aspects, device 102, device 140, and/or device 150 may be configured to support a technical solution to utilize a beamforming (BF) training procedure, e.g., a Basic Beamforming Training (BBT) procedure, which may allow two or more STAs to train their analog smart antenna, for example, to determine the best sector to use to point in the direction of each other, for example, on transmit and/or receive directions, e.g., as described below.

In some demonstrative aspects, the basic beamforming training procedure may include a sector sweep by an initiator device to transmit training symbols and/or a training frame multiple times, for example, using different sectors, e.g., as described below.

In some demonstrative aspects, a receiver device (responder) may perform a receive sector sweep procedure, for example, during the sector sweep of the initiator device, e.g., as described below.

In other aspects, the receiver device may operate at an omni-receive mode to receive training frames from the initiator device.

In some demonstrative aspects, the receiver device may measure one or more values, e.g., a Received Signal Strength Indicator (RSSI), based on training frames that the receive device is capable of receiving from the initiator device.

In some demonstrative aspects, device 102, device 140, and/or device 150 may be configured to support a technical solution to perform beamforming training, e.g., the basic beamforming training procedure, over an mmWave wireless communication channel assisted by communications over a sub-10 GHz wireless communication channel, e.g., as described below.

In some demonstrative aspects, device 102, device 140, and/or device 150 may be configured to perform one or more operations of a procedure (also referred to as "sub-10 Ghz assisted procedure"), which may make use of an existing sub-10 Ghz link, e.g., a sub-7 GHz link, between two STAs that intend to establish an mmWave link, e.g., a 60 GHz link, to exchange discovery and/or beamforming training-related information, e.g., as described below.

In some demonstrative aspects, the sub-10 Ghz assisted procedure may be configured for implementation by a first STA, e.g., a STA implemented by device 102, and a second STA, e.g., a STA implemented by device 140, to perform discovery and/or initial beamforming training in the mmWave band, e.g., the 60 GHz band, for example, by exchanging related information on an existing sub-10 Ghz link, e.g., a sub-7 GHz link, as described below.

In some demonstrative aspects, the sub-10 Ghz assisted procedure may be configured for implementation by two STAs that have a sub-7 GHz link established to perform 60 GHz discovery and/or initial beamforming, e.g., as described below.

In some demonstrative aspects, for example, the sub-10 Ghz assisted procedure may include a first phase (phase 1), which may be configured to support the 60 GHz discovery and initial beamforming process. For example, the first phase may be initiated with the exchange of BF-assistance information on an existing sub-7 GHz link. For example, the BF-assistance information may include system parameters, e.g., a number of sectors, and/or target start time, which may assist in configuring the BF over the mmWave band.

In some demonstrative aspects, for example, the sub-10 Ghz assisted procedure may include a second phase (phase 2), which may be configured to support discovery and/or initial beamforming training over the mmWave band. For example, the second phase may include a transmit sector-sweep by an AP, e.g., using different sectors, and possibly other beamforming training procedures.

For example, during the phase 2, the sector-sweep by the AP may include transmission of training (TRN) signals in a MAC frame and/or a Null Data Packet (NDP). For example, the AP may provide to a STA information, e.g., a sector identifier (ID and/or basic service set identifier (BSSID), in PHY and/or MAC.

For example, the TRN signals may be configured in accordance with an IEEE 802.11ad/ay Specification. In another example, the TRN signal may have any other additional or alternative configuration.

For example, the TRN signals may be configured to include Long Training Field (LTF)/training sequences, which may be transmitted a plurality of times, e.g., X times. For example, a receiver STA may lock reception in an omni-directional receive mode, for example, based on a first part of a PPDU from the AP, and may use a different Rx sector, e.g., for each LTF/training sequence, for example, to perform Rx training.

In some demonstrative aspects for example, the sub-10 Ghz assisted procedure may include a third phase (phase 3), which may be configured to support feedback of the discovery and initial beamforming process, for example, over the existing sub-7 GHz link.

For example, the STA may be configured to send to the AP a feedback frame including feedback information, for example, based on measurements performed by the STA on the TRN signals received by the STA. For example, the feedback information may include an indication of one or more sectors, e.g., a best sector, which may be identified based on the measurements. For example, the feedback information may include some or all of the measurement information corresponding to the one or more sectors, e.g., an RSSI corresponding to the best sector, and/or any other additional or alternative information.

In some demonstrative aspects, device 102, device 140, and/or device 150 may be configured to implement a communication mechanism, which may address one or more technical issues for operation over the mmWave band, e.g., over the 60 GHz band, as described below.

For example, there may be a need to address a technical issue where two STAs communicating over an mmWave band may perform beamforming on both links between the two STAs, e.g., both on a downlink from a first STA to a second STA and on an uplink from the second STA to the first STA, e.g., in order to close the link between the two STAs.

For example, in case of a plurality of STAs associated with an mmWave AP, e.g., a 60 GHz AP, there may be a need to address a technical issue for performing BF on both Tx and Rx sides to close a link between the mmWave AP and the plurality of STAs.

In one example, a communication time may be split between the plurality of STAs, for example, using a plurality of Service Periods (SPs), e.g., Target Wake Time (TWT) SPs. For example, the AP may allocate a TWT SP, which may be dedicated to one STA, and may be configured to allow the mmWave AP and the STA to beamform towards each other during the TWT SP. However, according to this solution the mmWave AP may not be able to receive communications from the other STAs. For example, this solution may be relatively rigid and may require longer inter-SP time, for example, as it may actually not be possible to have many STAs share the same TWT SP, and the communication time of the AP may have to be shared among all active STAs.

In another example, a control PHY mode may be defined, for example, to allow all STAs to be addressed and/or to access an mmWave channel, for example, anytime, e.g., even without scheduling. For example, the control PHY mode may be implemented to support a technical solution to allow an AP to receive a signal from a STA, for example, when the STA is beamforming to the AP, e.g., while the AP is in an omni-receive mode. However, implementation of the PHY control mode may have one or more constraints.

In some demonstrative aspects, device 102, device 140, and/or device 150 may be configured to implement a communication mechanism (also referred to as a "hybrid mechanism"), which may be configured to support communication between an AP and a plurality of STAs, for example, via a sector (also referred to as "Grouping Sector (GS)" or "group sector"), e.g., as described below.

In some demonstrative aspects, the AP may group a plurality of STA into a GS, which may be, for example, less-narrower than a BF sector, which may be utilized for BF communication between the AP and a STA, e.g., as described below.

In some demonstrative aspects, the GS may be configured, for example, to allow the AP to reach multiple STAs within the grouping sector, e.g., as described below.

In some demonstrative aspects, an AP may be configured to define a shared TWT SP for the plurality of STA corresponding to the grouping sector, e.g., as described below.

In some demonstrative aspects, the AP and the STAs assigned to the shared TWT SP may be able to share the wireless communication medium, for example, according to one or more shared channel-access mechanisms, TWT rules, or the like.

In some demonstrative aspects, an AP, e.g., an AP implemented by device 102, may be configured to implement a beamforming procedure to perform a beamforming training between the AP and a plurality of STAs, e.g., as described below.

In some demonstrative aspects, controller 124 may be configured to cause an AP implemented by device 102 to determine a plurality of beamformed sectors for communication with a plurality of STAs, e.g., as described below.

For example, the AP implemented by device 102 may be configured to determine the plurality of beamformed sectors including, for example, a beamformed sector for communication with a STA implemented by device 140 and/or a beamformed sector for communication with a STA implemented by device 150.

In some demonstrative aspects, a beamformed sector for communication with a STA may be based, for example, on a beamforming training between the AP and the STA, e.g., as described below.

In one example, the AP implemented by device 102 may determine a beamformed sector for communication with the STA implemented by device 140, for example, based on a beamforming training between device 102 and device 140.

In another example, the AP implemented by device 102 may determine a beamformed sector for communication with the STA implemented by device 150, for example, based on a beamforming training between device 102 and device 150.

In some demonstrative aspects, controller 124 may be configured to cause the AP implemented by device 102 to determine a grouping sector for communication between the AP and a group of STAs including two or more grouped STAs of the plurality of STAs, e.g., as described below.

In some demonstrative aspects, the grouping sector may be configured to cover two or more beamformed sectors corresponding to the two or more grouped STAs, e.g., as described below.

For example, the AP implemented by device 102 may determine a grouping sector configured to cover two or more beamformed sectors, e.g., including the beamformed sector corresponding to the STA implemented by device 140 and/or the beamformed sector corresponding to the STA implemented by device 150.

In some demonstrative aspects, controller 124 may be configured to cause the AP implemented by device 102 to listen over the grouping sector for a transmission from a grouped STA of the group of STAs, e.g., as described below.

In some demonstrative aspects, controller 124 may be configured to cause the AP implemented by device 102 to communicate a beamformed transmission with the grouped STA from which the transmission is received via a beamformed sector, for example, based on the transmission from the grouped STA, e.g., as described below.

In some demonstrative aspects, controller 124 may be configured to cause the AP implemented by device 102 to communicate a beamformed transmission with the grouped STA, for example, via the beamformed sector corresponding to the grouped STA, e.g., as described below.

In one example, the AP implemented by device 102 may communicate a beamformed transmission with the grouped STA implemented by device 140 via a beamformed sector corresponding to device 140, for example, based on a transmission from device 140 received via the grouping sector.

In another example, the AP implemented by device 102 may communicate a beamformed transmission with the grouped STA implemented by device 150 via a beamformed sector corresponding to device 150, for example, based on a transmission from device 150 received via the grouping sector.

In some demonstrative aspects, controller 124 may be configured to cause the AP implemented by device 102 to listen over the grouping sector to receive the transmission from the grouped STA in a control frame, e.g., as described below.

In some demonstrative aspects, the control frame may include a Request to Send (RTS), e.g., as described below. In other aspects, the control frame may include any other type of control frame.

In some demonstrative aspects, controller 124 may be configured to cause the AP implemented by device 102 to transmit a control response via the grouping sector, for example, based on the control frame from the grouped STA, e.g., as described below.

In some demonstrative aspects, controller 124 may be configured to cause the AP implemented by device 102 to communicate the beamformed transmission with the grouped STA, for example, after the control response, e.g., as described below.

In one example, the AP implemented by device 102 may be configured to communicate a beamformed transmission with the grouped STA implemented by device 140, for example, after transmitting a control response to the grouped STA implemented by device 140.

In another example, the AP implemented by device 102 may be configured to a the beamformed transmission with the grouped STA implemented by device 150, for example, after transmitting a control response to the grouped STA implemented by device 150.

In some demonstrative aspects, the plurality of beamformed sectors may include a plurality of narrow-beam sectors, e.g., as described below.

In some demonstrative aspects, the grouping sector may include a wide-beam sector extending over of the plurality of narrow-beam sectors, e.g., as described below.

In some demonstrative aspects, controller 124 may be configured to cause the AP implemented by device 102 to allocate the two or more grouped STAs to a group contention-based period, e.g., as described below.

In some demonstrative aspects, the group contention-based period may be configured to allow the two or more grouped STAs to transmit to the AP, for example, according to a contention mechanism, e.g., as described below.

For example, the AP implemented by device 102 may allocate the STA implemented by device 140 and/or the STA implemented by device 150 to a group contention-based period, during which device 140 and/or device 150 may be allowed to transmit to device 102, for example, according to a contention mechanism.

In some demonstrative aspects, controller 124 may be configured to cause the AP implemented by device 102 to listen over the grouping sector during the group contention-based period, e.g., as described below.

In some demonstrative aspects, the group contention-based period may include a TWT SP allocated to the group of STAs, e.g., as described below.

In other aspects, the group contention-based period may include any other additional or alternative type and/or configuration of an SP.

In some demonstrative aspects, controller 124 may be configured to cause the AP implemented by device 102 to process a beamforming feedback from a STA of the plurality of STAs, for example, based on the beamforming training between the AP and the STA, e.g., as described below.

In one example, the AP implemented by device 102 may process a beamforming feedback from the STA implemented by device 140, for example, based on the beamforming training between device 102 and device 140.

In another example, the AP implemented by device 102 may process a beamforming feedback from the STA implemented by device 150, for example, based on the beamforming training between device 102 and device 150.

In some demonstrative aspects, for example, the AP implemented by device 102 may be configured to perform the beamforming training with the plurality of STAs to determine the best and/or the narrowest sector to utilize for data transmissions.

In one example, the AP implemented by device 102 may receive from the STA implemented by device 140 a feedback including an ID of the best identified sector of device 102, for example, during the beamforming training between device 102 and device 140.

In another example, the AP implemented by device 102 may receive from the STA implemented by device 150 a feedback including an ID of the best identified sector of device 102, for example, during the beamforming training between device 102 and device 150.

For example, device 102 may be configured to determine whether the AP implemented by device 102 may communicate with two or more STAs using a wider beam/sector, for example, in order to group the two or more STAs together into grouping sector, e.g., for all the time, or during a service period.

In some demonstrative aspects, the beamforming feedback from a STA may include an indication of a plurality of identified sectors of the AP, e.g., as described below.

In some demonstrative aspects, the plurality of identified sectors of the AP may be identified by the STA, for example, based on the beamforming training between the AP and the STA, e.g., as described below.

For example, the beamforming feedback from the STA implemented by device 140 may include an indication of a plurality of identified sectors of the AP implemented by device 102, which are identified by the STA implemented by device 140, e.g., based on the beamforming training between device 102 and device 140.

For example, the beamforming feedback from the STA implemented by device 150 may include an indication of a plurality of identified sectors of the AP implemented by device 102, which are identified by the STA implemented by device 150, e.g., based on the beamforming training between device 102 and device 150.

In some demonstrative aspects, the beamforming feedback from a STA may include an indication of all identified sectors of the AP, which are identified by the STA, for example, based on the beamforming training between the AP and the STA, e.g., as described below.

In one example, the beamforming feedback from the STA implemented by device 140 may include an indication of all identified sectors of the AP implemented by device 102, which are identified by device 140, for example, based on the beamforming training between device 102 and device 140.

In another example, the beamforming feedback from the STA implemented by device 150 may include an indication of all identified sectors of the AP implemented by device 102, which are identified by device 150, for example, based on the beamforming training between device 102 and device 150.

In other aspects, the beamforming feedback from a STA may include an indication of only some of the identified sectors of the AP, which are identified by the STA, for example, based on the beamforming training between the AP and the STA. For example, the beamforming feedback from the STA may include an indication of two or more of the identified sectors of the AP, which may be selected based on one or more criteria, e.g., two or more sectors with the best measurements.

In some demonstrative aspects, controller 124 may be configured to cause the AP device implemented by device 102 to determine a grouping sector corresponding to a STA, for example, based on the plurality of identified sectors of the AP indicated by the beamforming feedback from the STA, e.g., as described below.

In one example, the AP device implemented by device 102 may determine a grouping sector corresponding to the STA implemented by device 140, for example, based on the plurality of identified sectors of device 102 indicated by the beamforming feedback from device 140.

In another example, the AP device implemented by device 102 may determine a grouping sector corresponding to the STA implemented by device 150, for example, based on the plurality of identified sectors of device 102 indicated by the beamforming feedback from device 150.

In some demonstrative aspects, the beamforming feedback from a STA may include measurement information corresponding to the plurality of identified sectors of the AP, e.g., as described below.

In some demonstrative aspects, the measurement information from the STA may be based on measurements of the STA during the beamforming training between the AP and the STA, e.g., as described below.

In one example, the beamforming feedback from the STA implemented by device 140 may include measurement information corresponding to the plurality of identified sectors of the AP implemented by device 102, e.g., based on the beamforming training between device 102 and device 140.

In another example, the beamforming feedback from the STA implemented by device 150 may include measurement information corresponding to the plurality of identified sectors of the AP implemented by device 102, e.g., based on the beamforming training between device 102 and device 150.

In some demonstrative aspects, controller 124 may be configured to cause the AP implemented by device 102 to transmit a beamforming training announcement to announce a group beamforming training with the group of STAs, e.g., as described below.

For example, the AP implemented by device 102 to transmit the beamforming training announcement to announce the group beamforming training with the group of STAs including the STA implemented by device 140 and/or the STA implemented by device 150.

For example, two or more STAs, e.g., including the STA implemented by device 140 and/or the STA implemented by device 150, may be grouped within a group contention-based period, e.g., a TWT SP, which may be allocated for the group of STAs by an AP, e.g., the AP implemented by device 102, for example, after the group beamforming training.

For example, during the group contention-based period, the group of STAs may beamform towards the AP, and the AP may utilize the group sector for this group of STAs. According to this example, the STAs in the group of STAs and the AP may be able to hear each other, and/or may be able to communicate and share the medium with a channel access mechanism.

In some demonstrative aspects, controller 124 may be configured to cause the AP implemented by device 102 to determine another grouping sector, e.g., in addition to the grouping sector for the group of STAs including devices 140 and/or 150, for communication between the AP and one or more other STAs of the plurality of STAs, e.g., as described below.

In some demonstrative aspects, controller 124 may be configured to cause the AP implemented by device 102 to determine a plurality of grouping sectors for communication between the AP and a plurality of groups of STAs, e.g., as described below.

In some demonstrative aspects, the plurality of grouping sectors may be configured to include a first grouping sector for communication between the AP and a first group of STAs, and/or a second grouping sector for communication between the AP and a second group of STAs, e.g., as described below.

For example, the AP implemented by device 102 may determine a grouping sector for communication between device 102 and a first group of STAs, for example, including the STA implemented by device 140 and/or the STA implemented by device 150; and a second group of STAs, e.g., including one or more other STAs.

In some demonstrative aspects, the first grouping sector may be configured to have no overlap with the second grouping sector.

In other aspects, the first grouping sector may have some, e.g., partial, overlap with the second grouping sector.

In some demonstrative aspects, an AP, e.g., the AP implemented by device 102, may be configured to perform the group beamforming training, for example, according to a dedicated beamforming training (BBT), for example, to determine one or more grouping sectors to be used for one or more groups of STAs, e.g., as described below.

In some demonstrative aspects, for example, the group beamforming training may include one or more operations and/or procedures, which may be similar to the initial BF training, e.g., which may be used for identifying the best and most narrow sector among all the narrow sectors for a STA.

In some demonstrative aspects, the AP may be configured to announce to the plurality of STAs, e.g., via a BBT trigger/announcement, that the BBT is to be performed for determining grouping sectors by the AP.

In some demonstrative aspects, a STA of the plurality of STAs, e.g., the STA implemented by device 140 and/or the STA implemented by device 150, may be configured to process the BBT with its best narrow Rx beamforming sector, for example, if the STA has already performed the initial beamforming procedure with the AP.

In some demonstrative aspects, a STA of the plurality of STAs, e.g., the STA implemented by device 140 and/or the STA implemented by device 150, may be configured to use a first sector of the STA, for example, in a group sector operation, e.g., when waiting for a signal from the AP.

In some demonstrative aspects, the STA, e.g., the STA implemented by device 140 and/or the STA implemented by device 150, may be configured to use a second sector of the STA, e.g., a narrow sector, for example, when listening for data transmission from a narrow sector of the AP.

In one example, the first sector and the second sector may coincide, e.g., partially or fully. In another example, the first sector and the second sector may include two different sectors.

In some demonstrative aspects, the STA, e.g., the STA implemented by device 140 and/or the STA implemented by device 150, may be configured to utilize the announcement message, which announces the group beamforming training, for example, to allow the STA to differentiate between a first BF training, e.g., the group BF training, which may be used by the STA to determine a sector of the STA, e.g., a best sector, to be used as the first sector for the STA; and a second BF training, e.g., the initial BF training, which may be used by the STA to determine a sector of the STA, e.g., a best sector, to be used as the second sector for the STA. For example, the STA may be configured to utilize the signaling in the announcement message to identify which sector is to be used at which time.

In some demonstrative aspects, a STA of the plurality of STAs, e.g., the STA implemented by device 140 and/or the STA implemented by device 150, may be configured to send to the AP the beamforming feedback including all sector IDs for which the STA received a signal from the AP, e.g., during the group beamforming training.

In one example, the STA may, e.g., possibly, include additional optional information in the beamforming feedback.

For example, the STA implemented by device 140 and/or the STA implemented by device 150 may include in the feedback to the AP an RSSI, the best sector ID, and/or any other additional or alternative information.

In some demonstrative aspects, the AP may be configured to determine for a sector, e.g., for each sector, which STAs are able to receive and/or to detect a signal and/or which STAs the AP device is able to receive from, for example, based on the beamforming feedback from the plurality of STAs.

In some demonstrative aspects, an AP, e.g., the AP implemented by device 102, may be configured to group the plurality of STAs, for example, based on the beamforming feedback from the plurality of STAs.

For example, the AP implemented by device 102 may be configured to assign one or more group contention-based periods, e.g., TWT SPs, to two or more STAs of the plurality of STAs, e.g., including the STA implemented by device 140 and/or the STA implemented by device 150. For example, the assignment of the STAs to the same TWT SP may result in the STAs de-facto becoming part of the same group.

In some demonstrative aspects, an AP, e.g., the AP implemented by device 102, may perform the grouping beamforming procedure, e.g., as a grouping BBT within the beamforming procedure. For example, the AP may be configured to signal to the STAs a type of a training field transmitted during the beamforming procedure, e.g., to identify whether the training field is to be used for training a grouping sector or for training a narrow sector. For example, performing the grouping BBT within the beamforming procedure may result in a longer beamforming training period.

In some demonstrative aspects, an AP, e.g., the AP implemented by device 102, may be configured to generate a TWT SP announcement/signaling, which may be configured for a group of STAs. For example, the modified TWT SP announcement/signaling may include guidance/rules on how a STA from the group of STAs may, e.g., should, parametrize an Rx sector of the STA, e.g., during/at a beginning of the TWT SP.

In some demonstrative aspects, an AP, e.g., the AP implemented by device 102, may be configured to support a transition protocol defining transition between a grouping sector, e.g., a wide-beam sector, and a beamformed sector, e.g., a narrow-beam sector. For example, the AP may apply the transition protocol all the time, or only during specific TWT SPs, e.g., group TWT SPs.

In some demonstrative aspects, for example, in case Enhanced Distributed Channel Access (EDCA) is allowed from a STA side and an AP side, the grouping sector may be used by an AP, e.g., the AP implemented by device 102, and STAs in a group assigned to the grouping sector, e.g., the STA implemented by device 140 and/or the STA implemented by device 150.

In some demonstrative aspects, a frame exchange sequence between the AP and a STA in the group, e.g., every frame exchange sequence, may, e.g., shall, start with a control frame exchange. In one example, the control frame exchange may include an exchange of an RTS and a Clear to Send (CTS) (RTS/CTS exchange). In another example, the control frame exchange may include an initial control frame sent with a defined minimum rate, and a control frame response. For example, both the AP and the STA may reconfigure their antenna to use the narrow sector used for data transmission, for example, based on completion of the control frame exchange.

In some demonstrative aspects, the AP and the STAs in the group may reconfigure their antenna to use the group sector again, for example, once a frame exchange for the data transmission is over.

In some demonstrative aspects, controller 154 may be configured to cause a STA implemented by device 140 to determine a first beamformed STA sector for communication with a beamformed sector of an AP, e.g., the AP implemented by device 102, e.g., as described below.

In some demonstrative aspects, controller 154 may be configured to cause the STA implemented by device 140 to determine a second beamformed STA sector for communication with a grouping sector of the AP implemented by device 102, e.g., as described below.

In some demonstrative aspects, controller 154 may be configured to cause the STA implemented by device 140 to identify a group contention-based period allocated to the STA, e.g., as described below. For example, the group contention-based period may be allocated by the AP implemented by device 102.

In some demonstrative aspects, controller 154 may be configured to cause the STA implemented by device 140 to, during the group contention-based period, transmit a transmission from the STA implemented by device 140 to the AP via the second beamformed STA sector, for example, according to a contention mechanism, e.g., as described below.

In some demonstrative aspects, controller 154 may be configured to cause the STA implemented by device 140 to communicate a beamformed transmission with the AP implemented by device 102 via the first beamformed STA sector, for example, after the transmission from the STA to the AP, e.g., as described below.

In some demonstrative aspects, controller 154 may be configured to cause the STA implemented by device 140 to transmit to the AP implemented by device 102 a beamforming feedback from the STA, for example, based on beamforming training between the STA and the AP, e.g., as described below.

In some demonstrative aspects, the beamforming feedback from the STA implemented by device 140 may include an indication of a plurality of identified sectors of the AP, which are identified by the STA implemented by device 140, for example, based on the beamforming training between the AP and the STA implemented by device 140.

In some demonstrative aspects, the beamforming feedback from the STA implemented by device 140 may include measurement information corresponding to the plurality of identified sectors of the AP.

In some demonstrative aspects, the measurement information may be based on measurements of the STA implemented by device 140 during the beamforming training between the AP and the STA implemented by device 140.

In some demonstrative aspects, the beamforming feedback from the STA implemented by device 140 may include an indication of all identified sectors of the AP, which are identified by the STA implemented by device 140, for example, based on the beamforming training between the AP and the STA implemented by device 140.

In other aspects, the beamforming feedback from the STA implemented by device 140 may include an indication of only some of the identified sectors of the AP, which are identified by the STA implemented by device 140. For example, the beamforming feedback from the STA implemented by device 140 may include an indication of the X best identified sectors of the AP.

In some demonstrative aspects, the group contention-based period may include a TWT SP allocated to a group of STAs including the STA implemented by device 140, e.g., as described above.

In some demonstrative aspects, controller 154 may be configured to cause the STA implemented by device 140 to process a beamforming training announcement from the AP to announce a group beamforming training, e.g., as described above.

For example, the STA implemented by device 140 may be configured to process the beamforming training announcement from the AP implemented by device 102, training, e.g., as described above.

In some demonstrative aspects, controller 154 may be configured to cause the STA implemented by device 140 to determine the second beamformed STA sector, for example, based on the group beamforming training, e.g., as described above.

In some demonstrative aspects, the transmission from the STA implemented by device 140 to the AP implemented by device 102 may include a control frame, e.g., as described above.

In some demonstrative aspects, the control frame may include an RTS. In other aspects the control frame may include a control frame of any other type.

In some demonstrative aspects, controller 154 may be configured to cause the STA implemented by device 140 to process a control response received from the AP via the second beamformed STA sector, e.g., as described above.

In some demonstrative aspects, controller 154 may be configured to cause the STA implemented by device 140 to communicate the beamformed transmission with the AP, for example, after the control response, e.g., as described above.

Figure 4:
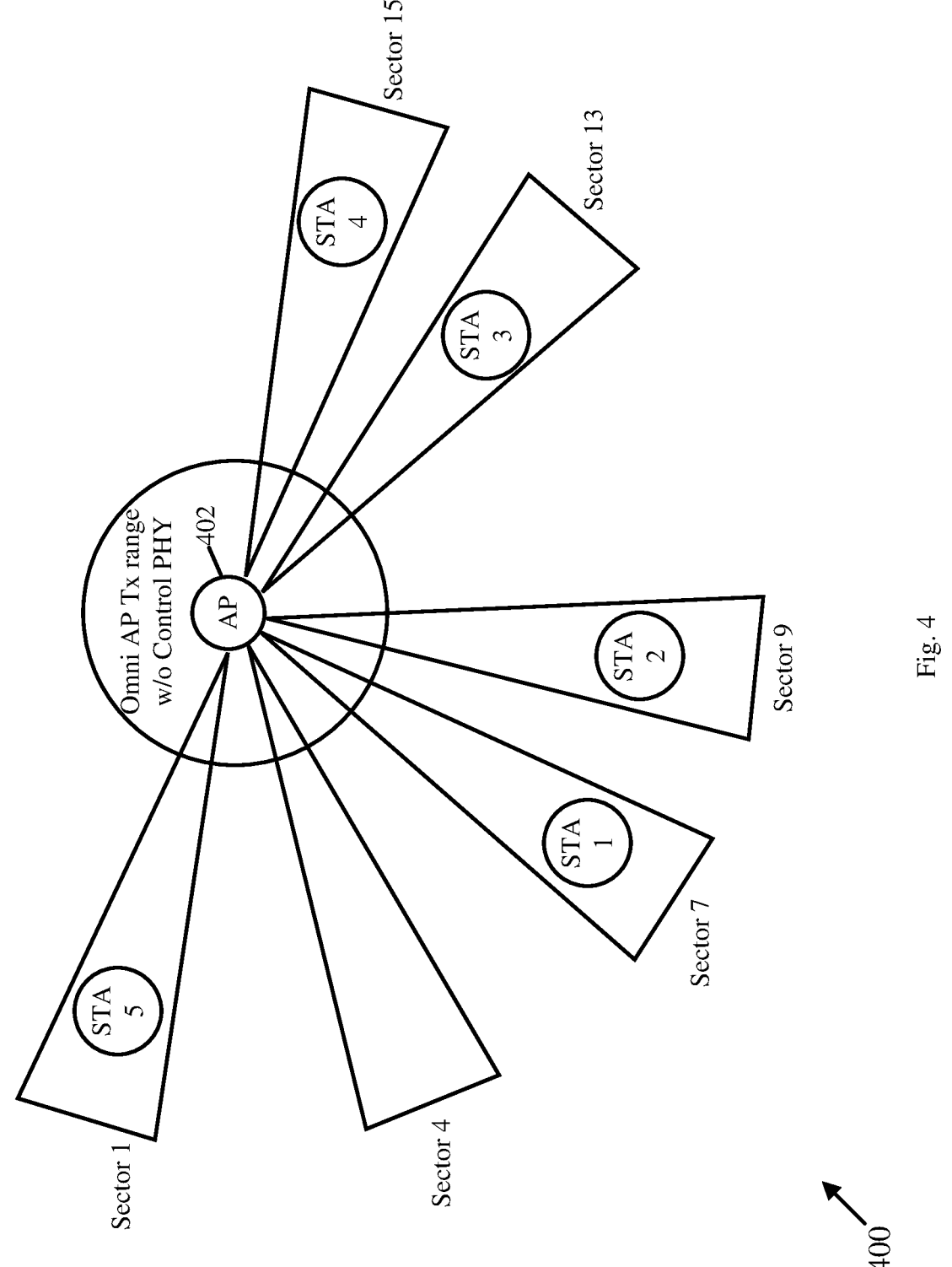
FIG. 4 is a schematic illustration of a plurality of beamformed sectors for data communication between an Access Point (AP) and a plurality of wireless communication stations (STAs), which may be implemented in accordance with some demonstrative aspects.

Reference is made to FIG. 4, which schematically illustrates a plurality of beamformed sectors 400 for data communication between an AP 402 and a plurality of STAs, in accordance with some demonstrative aspects.

For example, controller 124 (FIG. 1) may be configured to control, trigger, and/or cause an AP implemented by device 102 (FIG. 1) to perform a role of, one or more operations of, and/or one or more functionalities of, AP 402.

In some demonstrative aspects, as shown in FIG. 4, the AP 402 may be configured to determine the plurality of beamformed sectors 400 for communication with the plurality of STAs, for example, based on a beamforming training between the AP 402 and the plurality of STAs.

In some demonstrative aspects, as shown in FIG. 4, the plurality of beamformed sectors may include a plurality of narrow-beam sectors.

For example, as shown in FIG. 4, the AP 402 may determine a sector denoted sector 7, e.g., a narrow-beam sector, for data communication with a STA, denoted STA1, for example, based on a beamforming training, e.g., an initial beamforming training, between the AP 402 and the STA 1.

For example, as shown in FIG. 4, the AP 402 may determine a sector denoted sector 9, e.g., a narrow-beam sector, for data communication with a STA, denoted STA 2, for example, based on a beamforming training, e.g., an initial beamforming training, between the AP 402 and the STA 2.

For example, as shown in FIG. 4, the AP 402 may determine a sector denoted sector 13, e.g., a narrow-beam sector, for data communication with a STA, denoted STA 3, for example, based on a beamforming training, e.g., an initial beamforming training, between the AP 402 and the STA 3.

For example, as shown in FIG. 4, the AP 402 may determine a sector denoted sector 15, e.g., a narrow-beam sector, for data communication with a STA, denoted STA 4, for example, based on a beamforming training, e.g., an initial beamforming training, between the AP 402 and the STA 4.

For example, as shown in FIG. 4, the AP 402 may determine a sector denoted sector 1, e.g., a narrow-beam sector, for data communication with a STA, denoted STA 5, for example, based on a beamforming training, e.g., an initial beamforming training, between the AP 402 and the STA 5.

In one example, the sectors determining according to the beamforming training with the STAs may include the most-narrow beams, which may be used for example, for data transmissions between the AP 402 and the plurality of STAs, e.g., one at a time.

Figure 5:
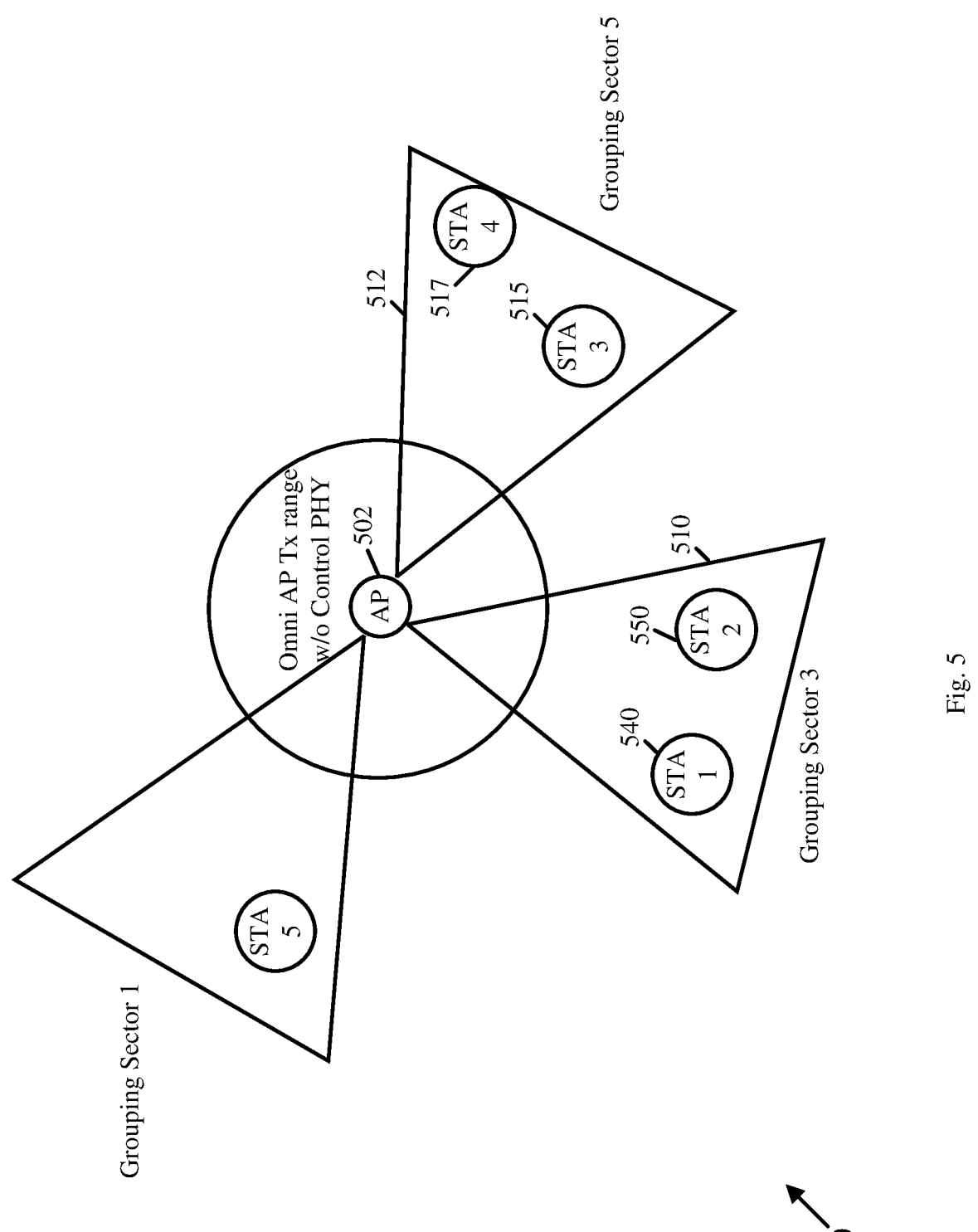
FIG. 5 is a schematic illustration of an allocation of a plurality of grouping sectors, in accordance with some demonstrative aspects.

Reference is made to FIG. 5, which schematically illustrates an allocation of a plurality of grouping sectors 500, in accordance with some demonstrative aspects.

In some demonstrative aspects, as shown in FIG. 5, an AP 502 may be configured to allocate the plurality of grouping sectors 500 to a plurality of STAs.

In some demonstrative aspects, the plurality of STAs may include the STA 1, the STA 2, the STA 2, the STA 4, and/or the STA 5, e.g., as described above with reference to FIG. 4.

For example, controller 124 (FIG. 1) may be configured to control, trigger, and/or cause an AP implemented by device 102 (FIG. 1) to perform a role of, one or more operations of, and/or one or more functionalities of, AP 502.

For example, controller 154 (FIG. 1) may be configured to control, trigger, and/or cause a STA implemented by device 140 (FIG. 1) to perform a role of, one or more operations of, and/or one or more functionalities of, a STA of the plurality of STAs, e.g., a STA 540.

For example, a STA implemented by device 150 (FIG. 1) may be configured to perform a role of, one or more operations of, and/or one or more functionalities of, another STA of the plurality of STAs, e.g., a STA 550.

In some demonstrative aspects, as shown in FIG. 5, the AP 502 may be configured to determine the plurality of grouping sectors 500 for communication between the AP 502 and a plurality of groups of STAs.

In some demonstrative aspects, as shown in FIG. 5, the plurality of grouping sectors 500 may include a first grouping sector, e.g., a grouping sector 510, for communication between the AP 502 and a first group of STAs, e.g., including STA 540 and/or STA 550.

In some demonstrative aspects, as shown in FIG. 5, the plurality of grouping sectors 500 may include a second grouping sector, e.g., a grouping sector 512, for communication between the AP 502 and a second group of STAs, e.g., including a STA 515 and/or a STA 517.

In some demonstrative aspects, as shown in FIG. 5, the grouping sector 510 may have no overlap with the grouping sector 512.

In other aspects, the grouping sector 510 may have an overlap, e.g., a partial overlap, with the grouping sector 512.

In some demonstrative aspects, the AP 502 may be configured to determine another grouping sector for communication between the AP 502 and one or more other STAs of the plurality of STAs.

For example, as shown in FIG. 5, the AP 502 may be configured to determine a grouping sector, e.g., denoted grouping sector 1, for communication between the AP 502 and a STA, e.g., the STA 5.

In some demonstrative aspects, as shown in FIG. 5, the grouping sectors 500 may include wider sectors/beams, e.g., wider than the sectors 400 (FIG. 4), which may still be beamformed enough, for example, to close the link with a group of STAs.

In some demonstrative aspects, as shown in FIG. 5, the grouping sectors 500 may include wider sectors/beams, e.g., wider than the sectors 400 (FIG. 4), which may allow the AP 502 to receive signals from more than one STA. For example, the grouping sector 3 may be used serve the STA 1 and the STA 2.

In some demonstrative aspects, the AP 502 may be configured to allocate the STAs of a STA group, e.g., the STA 540 and the STA 550, to a group contention-based period, e.g., a TWT SP, during which the STAs of the STA group may be allowed to transmit to the AP 502 according to a contention mechanism, e.g., as described above.

In some demonstrative aspects, the AP 502 may be configured to listen over the grouping sector 510 for a transmission from a grouped STA of the group of STAs, e.g., as described above.

In some demonstrative aspects, the AP 502 may receive a transmission from a grouped STA of the group of STAs, e.g., a control frame from STA 540, as described above.

In some demonstrative aspects, the AP 502 may communicate a beamformed transmission with the grouped STA via a beamformed sector corresponding to the grouped STA, e.g., as described above.

For example, based on the control frame from the STA 540, which may be received by the AP 502 via the grouping sector 510, the AP 502 may communicate a beamformed transmission with the STA 540 via a beamformed sector corresponding to the grouped STA, e.g., the sector 7 (FIG. 4) corresponding to the STA 2.

Figure 6:
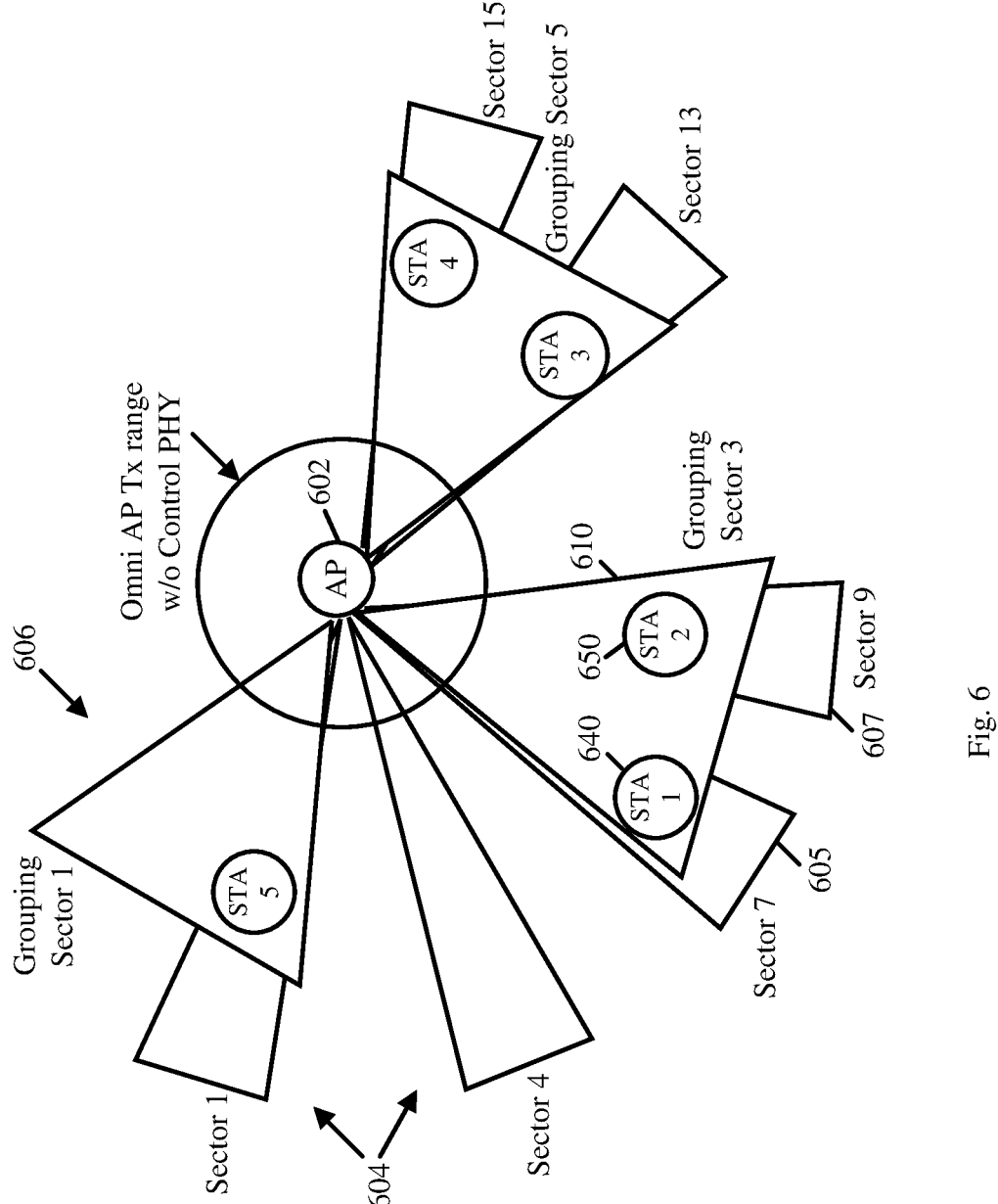
FIG. 6 is a schematic illustration of an allocation of a plurality of grouping sectors based on a plurality of beamformed sectors, in accordance with some demonstrative aspects.

Reference is made to FIG. 6, which schematically illustrates an allocation of a plurality of grouping sectors 606 based on a plurality of beamformed sectors 604, in accordance with some demonstrative aspects.

In some demonstrative aspects, as shown in FIG. 6, an AP 602 may be configured to determine the plurality of beamformed sectors 604 for communication with a plurality of STAs.

For example, controller 124 (FIG. 1) may be configured to control, trigger, and/or cause an AP implemented by device 102 (FIG. 1) to perform a role of, one or more operations of, and/or one or more functionalities of, AP 602.

For example, controller 154 (FIG. 1) may be configured to control, trigger, and/or cause a STA implemented by device 140 (FIG. 1) to perform a role of, one or more operations of, and/or one or more functionalities of, a STA of the plurality of STAs, e.g., a STA 640.

For example, a STA implemented by device 150 (FIG. 1) may be configured to perform a role of, one or more operations of, and/or one or more functionalities of, another STA of the plurality of STAs, e.g., a STA 650.

In one example, as shown in FIG. 6, the AP 602 may be configured to determine a beamformed sector 605 for communication with STA 640, for example, based on a beamforming training between the AP 602 and the STA 640.

In one example, as shown in FIG. 6, the AP 602 may be configured to determine a beamformed sector 607 for communication with STA 650, for example, based on a beamforming training between the AP 602 and the STA 650.

In some demonstrative aspects, the plurality of beamformed sectors 604 may include a plurality of narrow-beam sectors.

In some demonstrative aspects, as shown in FIG. 6, the AP 602 may be configured to determine a plurality of grouping sectors 606 for communication between the AP 602 and a plurality of groups of STAs.

In some demonstrative aspects, a group of STAs of the plurality of groups of STAs may include two or more grouped STAs of the plurality of STAs.

In some demonstrative aspects, as shown in FIG. 6, a grouping sector of the plurality of grouping sectors may cover two or more beamformed sectors corresponding to the two or more grouped STAs.

For example, as shown in FIG. 6, the AP 602 may allocate a grouping sector 610 for communication with a group of STAs including STA 640 and/or STA 650.

For example, as shown in FIG. 6, the AP 602 may be configured to determine the grouping sector 610 to cover the beamformed sectors 605 and 607.

In some demonstrative aspects, the grouping sector may include a wide-beam sector extending over of the plurality of narrow-beam sectors.

For example, as shown in FIG. 6, the grouping sector 610 may extend over the beamformed sector 605 and the beamformed sector 607.

In some demonstrative aspects, the AP 602 may be configured to allocate the STAs of a STA group, e.g., the STA 640 and the STA 650 of the STA group allocated to the grouping sector 601, to a group contention-based period, e.g., a TWT SP, during which the STAs of the STA group may be allowed to transmit to the AP 602, for example, according to a contention mechanism, e.g., as described above.

In some demonstrative aspects, the AP 602 may be configured to listen over the grouping sector for a transmission from a grouped STA of the group of STAs.

In one example, the AP 602 may listen over the grouping sector 610 for a transmission from a STA in the group of STAs allocated to the grouping sector 610.

In some demonstrative aspects, the AP 602 may be configured to communicate a beamformed transmission with a grouped STA via a beamformed sector corresponding to the grouped STA, for example, based on receipt of a transmission from the grouped STA via the grouping sector 610.

In one example, the AP 602 may communicate a beamformed transmission with the STA 640 via the beamformed sector 605, for example, based on receipt of a transmission from the STA 640 via the grouping sector 610.

In another example, the AP 602 may communicate a beamformed transmission with the STA 640 via the beamformed sector 605, for example, based on receipt of a transmission from the STA 650 via the grouping sector 610.

Reference is made to FIG. 7, which schematically illustrates a method of communicating a beamformed transmission, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1), device 140 (FIG. 1), and/or device 150 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include determining at an AP a plurality of beamformed sectors for communication with a plurality of STAs, wherein a beamformed sector for communication with a STA is based on a beamforming training between the AP and the STA. For example, controller 124 (FIG. 1) may be configured to cause, trigger, and/or control device 102 (FIG. 1) to determine the plurality of beamformed sectors for communication with the plurality of STAs, e.g., as described above.

As indicated at block 704, the method may include determining a grouping sector for communication between the AP and a group of STAs including two or more grouped STAs of the plurality of STAs, wherein the grouping sector covers two or more beamformed sectors corresponding to the two or more grouped STAs. For example, controller 124 (FIG. 1) may be configured to cause, trigger, and/or control device 102 (FIG. 1) to determine the grouping sector for communication between the AP and the group of STAs including two or more grouped STAs of the plurality of STAs, e.g., as described above.

As indicated at block 706, the method may include listening over the grouping sector for a transmission from a grouped STA of the group of STAs. For example, controller 124 (FIG. 1) may be configured to cause, trigger, and/or control device 102 (FIG. 1) to listen over the grouping sector for the transmission from the grouped STA of the group of STAs, e.g., as described above.

As indicated at block 708, the method may include communicating, based on the transmission from the grouped STA, a beamformed transmission with the grouped STA via a beamformed sector corresponding to the grouped STA. For example, controller 124 (FIG. 1) may be configured to cause, trigger, and/or control device 102 (FIG. 1) to communicate, based on the transmission from the grouped STA, the beamformed transmission with the grouped STA via the beamformed sector corresponding to the grouped STA, e.g., as described above.

Figure 8:
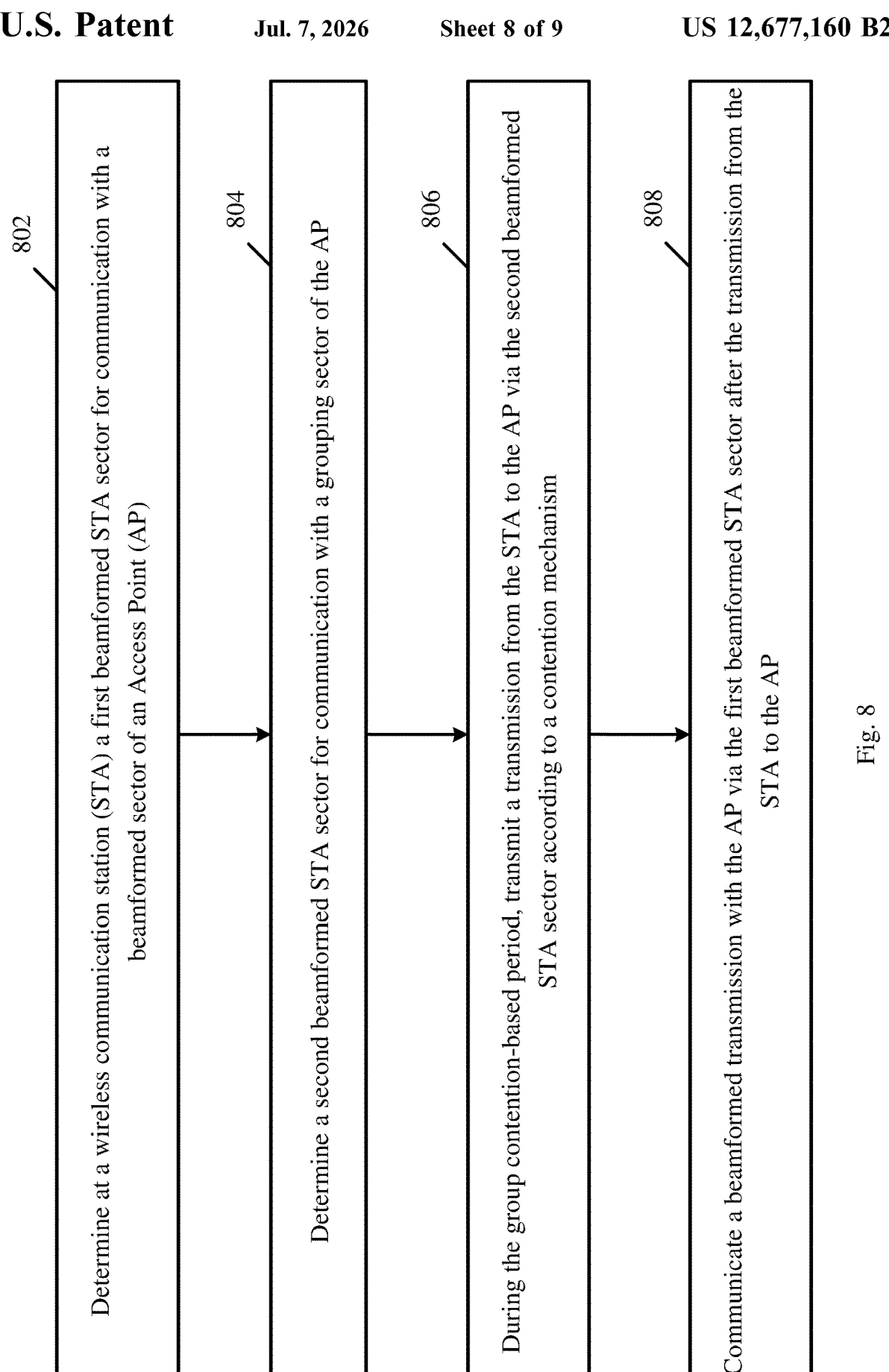
FIG. 8 is a schematic flow-chart illustration of a method of communicating a beamformed transmission, in accordance with some demonstrative aspects.

Reference is made to FIG. 8, which schematically illustrates a method of communicating a beamformed transmission, in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1), device 140 (FIG. 1), and/or device 150 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include determining at a STA a first beamformed STA sector for communication with a beamformed sector of an AP. For example, controller 154 (FIG. 1) may be configured to cause, trigger, and/or control device 140 (FIG. 1) to determine a first beamformed STA sector for communication with a beamformed sector of device 102 (FIG. 1), e.g., as described above.

As indicated at block 804, the method may include determining a second beamformed STA sector for communication with a grouping sector of the AP. For example, controller 154 (FIG. 1) may be configured to cause, trigger, and/or control device 140 (FIG. 1) to determine the second beamformed STA sector for communication with a grouping sector of device 102 (FIG. 1), e.g., as described above.

As indicated at block 806, the method may include identifying a group contention-based period allocated to the STA. For example, controller 154 (FIG. 1) may be configured to cause, trigger, and/or control device 140 (FIG. 1) to identify the group contention-based period allocated to device 140 (FIG. 1), e.g., as described above.

As indicated at block 808, the method may include communicating a beamformed transmission with the AP via the first beamformed STA sector, for example, after the transmission from the STA to the AP. For example, controller 154 (FIG. 1) may be configured to cause, trigger, and/or control device 140 (FIG. 1) to communicate a beamformed transmission with device 102 (FIG. 1) via the first beamformed STA sector, for example, after the transmission from device 140 (FIG. 1) to device 102 (FIG. 1), e.g., as described above.

Figure 9:
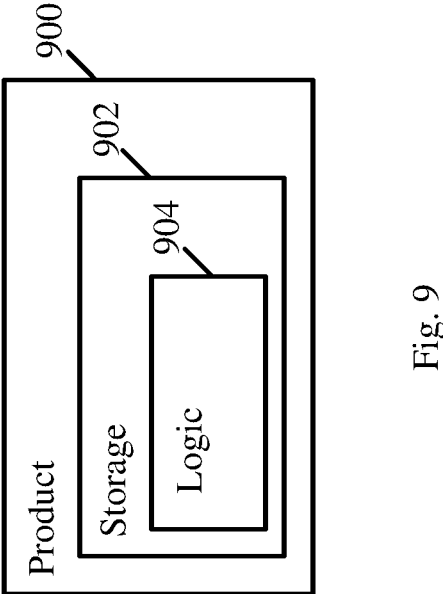
FIG. 9 is a schematic illustration of a product of manufacture, in accordance with some demonstrative aspects.

Reference is made to FIG. 9, which schematically illustrates a product of manufacture 900, in accordance with some demonstrative aspects. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), device 150 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

Examples

The following examples pertain to further aspects.

Example 1 includes an apparatus comprising logic and circuitry configured to cause an Access Point (AP) to determine a plurality of beamformed sectors for communication with a plurality of wireless communication stations (STAs), wherein a beamformed sector for communication with a STA is based on a beamforming training between the AP and the STA; determine a grouping sector for communication between the AP and a group of STAs comprising two or more grouped STAs of the plurality of STAs, wherein the grouping sector covers two or more beamformed sectors corresponding to the two or more grouped STAs; listen over the grouping sector for a transmission from a grouped STA of the group of STAs; and based on the transmission from the grouped STA, communicate a beamformed transmission with the grouped STA via a beamformed sector corresponding to the grouped STA.

Example 2 includes the subject matter of Example 1, and optionally, wherein the apparatus is configured to cause the AP to allocate the two or more grouped STAs to a group contention-based period, during which the two or more grouped STAs are allowed to transmit to the AP according to a contention mechanism.

Example 3 includes the subject matter of Example 2, and optionally, wherein the apparatus is configured to cause the AP to listen over the grouping sector during the group contention-based period.

Example 4 includes the subject matter of Example 2 or 3, and optionally, wherein the group contention-based period comprises a Target Wake Time (TWT) Service Period (SP) allocated to the group of STAs.

Example 5 includes the subject matter of any one of Examples 1-4, and optionally, wherein the apparatus is configured to cause the AP to process a beamforming feedback from the STA based on the beamforming training between the AP and the STA, the beamforming feedback from the STA comprises an indication of a plurality of identified sectors of the AP, which are identified by the STA based on the beamforming training between the AP and the STA.

Example 6 includes the subject matter of Example 5, and optionally, wherein the apparatus is configured to cause the AP to determine a grouping sector corresponding to the STA based on the plurality of identified sectors of the AP indicated by the beamforming feedback from the STA.

Example 7 includes the subject matter of Example 5 or 6, and optionally, wherein the beamforming feedback from the STA comprises measurement information corresponding to the plurality of identified sectors of the AP, the measurement information based on measurements of the STA during beamforming training between the AP and the STA.

Example 8 includes the subject matter of any one of Examples 5-7, and optionally, wherein the beamforming feedback from the STA comprises an indication of all identified sectors of the AP, which are identified by the STA based on the beamforming training between the AP and the STA.

Example 9 includes the subject matter of any one of Examples 1-8, and optionally, wherein the apparatus is configured to cause the AP to transmit a beamforming training announcement to announce a group beamforming training with the group of STAs.

Example 10 includes the subject matter of any one of Examples 1-9, and optionally, wherein the apparatus is configured to cause the AP to determine a plurality of grouping sectors for communication between the AP and a plurality of groups of STAs, the plurality of grouping sectors comprising a first grouping sector for communication between the AP and a first group of STAs, and a second grouping sector for communication between the AP and a second group of STAs.

Example 11 includes the subject matter of Example 10, and optionally, wherein the first grouping sector has no overlap with the second grouping sector.

Example 12 includes the subject matter of any one of Examples 1-11, and optionally, wherein the apparatus is configured to cause the AP to determine another grouping sector for communication between the AP and one or more other STAs of the plurality of STAs.

Example 13 includes the subject matter of any one of Examples 1-12, and optionally, wherein the transmission from the grouped STA comprises a control frame.

Example 14 includes the subject matter of Example 13, and optionally, wherein the apparatus is configured to cause the AP to, based on the control frame from the grouped STA, transmit a control response via the grouping sector, and to communicate the beamformed transmission with the grouped STA after the control response.

Example 15 includes the subject matter of Example 13 or 14, and optionally, wherein the control frame comprises a Request to Send (RTS).

Example 16 includes the subject matter of any one of Examples 1-15, and optionally, wherein the plurality of beamformed sectors comprises a plurality of narrow-beam sectors, and wherein the grouping sector comprises a wide-beam sector extending over of the plurality of narrow-beam sectors.

Example 17 includes the subject matter of any one of Examples 1-16, and optionally, comprising at least one radio to communicate the beamformed transmission.

Example 18 includes the subject matter of Example 17, and optionally, comprising one or more antennas connected to the radio, and a processor to execute instructions of an operating system of the AP.

Example 19 includes an apparatus comprising logic and circuitry configured to cause a wireless communication station (STA) to determine a first beamformed STA sector for communication with a beamformed sector of an Access Point (AP); determine a second beamformed STA sector for communication with a grouping sector of the AP; identify a group contention-based period allocated to the STA; during the group contention-based period, transmit a transmission from the STA to the AP via the second beamformed STA sector according to a contention mechanism; and after the transmission from the STA to the AP, communicate a beamformed transmission with the AP via the first beamformed STA sector.

Example 20 includes the subject matter of Example 19, and optionally, wherein the apparatus is configured to cause the STA to transmit to the AP a beamforming feedback from the STA based on beamforming training between the STA and the AP, the beamforming feedback from the STA comprises an indication of a plurality of identified sectors of the AP, which are identified by the STA based on the beamforming training between the AP and the STA.

Example 21 includes the subject matter of Example 20, and optionally, wherein the beamforming feedback from the STA comprises measurement information corresponding to the plurality of identified sectors of the AP, the measurement information based on measurements of the STA during the beamforming training between the AP and the STA.

Example 22 includes the subject matter of Example 20 or 21, and optionally, wherein the beamforming feedback from the STA comprises an indication of all identified sectors of the AP, which are identified by the STA based on the beamforming training between the AP and the STA.

Example 23 includes the subject matter of any one of Examples 19-22, and optionally, wherein the group contention-based period comprises a Target Wake Time (TWT) Service Period (SP) allocated to a group of STAs comprising the STA.

Example 24 includes the subject matter of any one of Examples 19-23, and optionally, wherein the apparatus is configured to cause the STA to process a beamforming training announcement from the AP to announce a group beamforming training, and to determine the second beamformed STA sector based on the group beamforming training.

Example 25 includes the subject matter of any one of Examples 19-24, and optionally, wherein the transmission from the STA to the AP comprises a control frame.

Example 26 includes the subject matter of Example 25, and optionally, wherein the apparatus is configured to cause the STA to process a control response received from the AP via the second beamformed STA sector, and to communicate the beamformed transmission with the AP after the control response.

Example 27 includes the subject matter of Example 25 or 26, and optionally, wherein the control frame comprises a Request to Send (RTS).

Example 28 includes the subject matter of any one of Examples 19-27, and optionally, comprising a radio to transmit the transmission from the STA to the AP.

Example 29 includes the subject matter of Example 28, and optionally, comprising one or more antennas connected to the radio, and a processor to execute instructions of an operating system of the STA.

Example 30 comprises a wireless communication device comprising the apparatus of any of Examples 1-29.

Example 31 comprises an apparatus comprising means for executing any of the described operations of any of Examples 1-29.

Example 32 comprises a product comprising one or more tangible computer-readable non-transitory storage media comprising computer-executable instructions operable to, when executed by at least one processor, enable the at least one processor to cause a wireless communication device to perform any of the described operations of any of Examples 1-29.

Example 33 comprises an apparatus comprising: a memory interface; and processing circuitry configured to: perform any of the described operations of any of Examples 1-29.

Example 34 comprises a method comprising any of the described operations of any of Examples 1-29.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) to:
   determine a plurality of beamformed sectors for communication with a plurality of wireless communication stations (STAs), wherein a beamformed sector for communication with a STA is based on a beamforming feedback from the STA, the beamforming feedback from the STA comprises an indication of a plurality of identified sectors of the AP, which are identified by the STA based on a beamforming training between the AP and the STA;
   determine a grouping sector for communication between the AP and a group of STAs comprising two or more grouped STAs of the plurality of STAs, wherein the grouping sector covers two or more beamformed sectors corresponding to the two or more grouped STAs;
   listen over the grouping sector for a transmission from a grouped STA of the group of STAs; and
   based on the transmission from the grouped STA, communicate a beamformed transmission with the grouped STA via a beamformed sector corresponding to the grouped STA.

2. The apparatus of claim 1 configured to cause the AP to allocate the two or more grouped STAs to a group contention-based period, during which the two or more grouped STAs are allowed to transmit to the AP according to a contention mechanism.

3. The apparatus of claim 2 configured to cause the AP to listen over the grouping sector during the group contention-based period.

4. The apparatus of claim 2, wherein the group contention-based period comprises a Target Wake Time (TWT) Service Period (SP) allocated to the group of STAs.

5. The apparatus of claim 1 configured to cause the AP to determine a grouping sector corresponding to the STA based on the plurality of identified sectors of the AP indicated by the beamforming feedback from the STA.

6. The apparatus of claim 1, wherein the beamforming feedback from the STA comprises measurement information corresponding to the plurality of identified sectors of the AP, the measurement information based on measurements of the STA during the beamforming training between the AP and the STA.

7. The apparatus of claim 1, wherein the beamforming feedback from the STA comprises an indication of all identified sectors of the AP, which are identified by the STA based on the beamforming training between the AP and the STA.

8. The apparatus of claim 1 configured to cause the AP to transmit a beamforming training announcement to announce a group beamforming training with the group of STAs.

9. The apparatus of claim 1 configured to cause the AP to determine a plurality of grouping sectors for communication between the AP and a plurality of groups of STAs, the plurality of grouping sectors comprising a first grouping sector for communication between the AP and a first group of STAs, and a second grouping sector for communication between the AP and a second group of STAs.

10. The apparatus of claim 9, wherein the first grouping sector has no overlap with the second grouping sector.

11. The apparatus of claim 1 configured to cause the AP to determine another grouping sector for communication between the AP and one or more other STAs of the plurality of STAs.

12. The apparatus of claim 1, wherein the transmission from the grouped STA comprises a control frame.

13. The apparatus of claim 12 configured to cause the AP to, based on the control frame from the grouped STA, transmit a control response via the grouping sector, and to communicate the beamformed transmission with the grouped STA after the control response.

14. The apparatus of claim 1, wherein the plurality of beamformed sectors comprises a plurality of narrow-beam sectors, and wherein the grouping sector comprises a wide-beam sector extending over the plurality of narrow-beam sectors.

15. The apparatus of claim 1 comprising at least one radio to communicate the beamformed transmission.

16. The apparatus of claim 15 comprising one or more antennas connected to the radio, and a processor to execute instructions of an operating system of the AP.

17. A product comprising one or more tangible computer-readable non-transitory storage media comprising computer-executable instructions operable to, when executed by at least one processor, enable the at least one processor to cause an Access Point (AP) to:

determine a plurality of beamformed sectors for communication with a plurality of wireless communication stations (STAs), wherein a beamformed sector for communication with a STA is based on a beamforming feedback from the STA, the beamforming feedback from the STA comprises an indication of a plurality of identified sectors of the AP, which are identified by the STA based on a beamforming training between the AP and the STA;

determine a grouping sector for communication between the AP and a group of STAs comprising two or more grouped STAs of the plurality of STAs, wherein the grouping sector covers two or more beamformed sectors corresponding to the two or more grouped STAs;

listen over the grouping sector for a transmission from a grouped STA of the group of STAs; and based on the transmission from the grouped STA, communicate a beamformed transmission with the grouped STA via a beamformed sector corresponding to the grouped STA.

18. The product of claim 17, wherein the instructions, when executed, cause the AP to allocate the two or more grouped STAs to a group contention-based period, during which the two or more grouped STAs are allowed to transmit to the AP according to a contention mechanism.

19. An apparatus comprising logic and circuitry configured to cause a wireless communication station (STA) to:

transmit a beamforming feedback from the STA to an Access Point (AP), the beamforming feedback from the STA comprising an indication of a plurality of identified sectors of the AP, which are identified by the STA based on a beamforming training between the AP and the STA;

determine a first beamformed STA sector for communication with a beamformed sector of the AP;

determine a second beamformed STA sector for communication with a grouping sector of the AP;

identify a group contention-based period allocated to the STA;

during the group contention-based period, transmit a transmission from the STA to the AP via the second beamformed STA sector according to a contention mechanism; and after the transmission from the STA to the AP, communicate a beamformed transmission with the AP via the first beamformed STA sector.

20. The apparatus of claim 19 configured to cause the STA to process a beamforming training announcement from the AP to announce a group beamforming training, and to determine the second beamformed STA sector based on the group beamforming training.

21. The apparatus of claim 19, wherein the beamforming feedback from the STA comprises measurement information corresponding to the plurality of identified sectors of the AP, the measurement information based on measurements of the STA during the beamforming training between the AP and the STA.

22. The apparatus of claim 19, wherein the beamforming feedback from the STA comprises an indication of all identified sectors of the AP, which are identified by the STA based on the beamforming training between the AP and the STA.

23. An apparatus for a wireless communication station (STA), the apparatus comprising:

means for causing the STA to transmit a beamforming feedback from the STA to an Access Point (AP), the beamforming feedback from the STA comprising an indication of a plurality of identified sectors of the AP, which are identified by the STA based on a beamforming training between the AP and the STA;

means for determining a first beamformed STA sector for communication with a beamformed sector of the AP;

means for determining a second beamformed STA sector for communication with a grouping sector of the AP;

means for identifying a group contention-based period allocated to the STA;

means for causing the STA to, during the group contention-based period, transmit a transmission from the STA to the AP via the second beamformed STA sector according to a contention mechanism; and means for causing the STA to, after the transmission from the STA to the AP, communicate a beamformed transmission with the AP via the first beamformed STA sector.

24. The apparatus of claim 23, wherein the group contention-based period comprises a Target Wake Time (TWT) Service Period (SP) allocated to a group of STAs comprising the STA.

* * * * *